(12) United States Patent
Inoue

(10) Patent No.: US 12,518,932 B2
(45) Date of Patent: Jan. 6, 2026

(54) SOLID ELECTROLYTIC CAPACITOR CAPABLE OF REDUCING ESR VARIATION AND METHOD FOR MANUFACTURING THE SAME

(71) Applicant: Panasonic Intellectual Property Management Co., Ltd., Kadoma (JP)

(72) Inventor: Masamichi Inoue, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 83 days.

(21) Appl. No.: 18/682,222

(22) PCT Filed: Aug. 4, 2022

(86) PCT No.: PCT/JP2022/029896
§ 371 (c)(1),
(2) Date: Feb. 8, 2024

(87) PCT Pub. No.: WO2023/026811
PCT Pub. Date: Mar. 2, 2023

(65) Prior Publication Data
US 2024/0347279 A1    Oct. 17, 2024

(30) Foreign Application Priority Data
Aug. 23, 2021   (JP) .................. 2021-135805

(51) Int. Cl.
*H01G 9/012*    (2006.01)
*H01G 9/00*     (2006.01)
(Continued)

(52) U.S. Cl.
CPC .......... *H01G 9/012* (2013.01); *H01G 9/0029* (2013.01); *H01G 9/048* (2013.01); *H01G 9/15* (2013.01)

(58) Field of Classification Search
None
See application file for complete search history.

(56) References Cited

U.S. PATENT DOCUMENTS

| 5,377,073 A | * | 12/1994 | Fukaumi | H01G 9/15 |
| | | | | 29/25.03 |
| 2013/0222977 A1 | * | 8/2013 | Kawahito | H01G 9/08 |
| | | | | 361/523 |
| 2019/0287732 A1 | * | 9/2019 | Nagayama | H01G 9/15 |

FOREIGN PATENT DOCUMENTS

| JP | H02-052325 U1 | 4/1990 |
| JP | H04-243116 A | 8/1992 |

(Continued)

OTHER PUBLICATIONS

International Search Report dated Nov. 1, 2022, issued in counterpart International Application No. PCT/JP2022/029896 (5 pages).

*Primary Examiner* — Eric W Thomas
(74) *Attorney, Agent, or Firm* — WHDA, LLP

(57) ABSTRACT

A solid electrolytic capacitor 10 disclosed herein includes: a plurality of capacitor elements 11 stacked on top of each other, each capacitor element having an anode portion 13 and a cathode portion 14; an anode lead terminal 17 electrically connected to at least one of the anode portions 13; and three or more joining portions 20 joining and electrically connecting the stacked anode portions 13 together. The stacked anode portions 13 have a first surface 13a and a second surface 13b that are located outermost on one side and the other side, respectively, in the stacking direction. The three or more joining portions 20 include a first joining portion 21 having a first area on the first surface 13a and a second joining portion 22 having a second area smaller than the first area on the first surface 13a. Thus, variation in ESR can be reduced.

9 Claims, 2 Drawing Sheets

(51) Int. Cl.
*H01G 9/048* (2006.01)
*H01G 9/15* (2006.01)

(56) References Cited

FOREIGN PATENT DOCUMENTS

| | | |
|---|---|---|
| JP | 2006-140179 A | 6/2006 |
| JP | 2010-153437 A | 7/2010 |
| JP | 2015-136705 A | 7/2015 |

* cited by examiner

SOLID ELECTROLYTIC CAPACITOR CAPABLE OF REDUCING ESR VARIATION AND METHOD FOR MANUFACTURING THE SAME

CROSS REFERENCE TO RELATED APPLICATIONS

This Application is the National Stage of International Application No. PCT/JP2022/029896, filed on Aug. 4, 2022, which claims priority from Application No. 2021-135805 filed on Aug. 23, 2021 in Japan. The entire contents of these applications are incorporated herein by reference in their entirety.

TECHNICAL FIELD

The present disclosure relates to a solid electrolytic capacitor and a method for manufacturing a solid electrolytic capacitor.

BACKGROUND ART

Conventionally, solid electrolytic capacitors including a capacitor element from which an anode lead extends and an anode external terminal connected to the anode lead are known (e.g., PTL 1). In a solid electrolytic capacitor disclosed in PTL1, the anode external terminal has a plate-shaped connecting portion connected to an anode lead terminal, and a plurality of welded points are formed on the connecting portion.

CITATION LIST

Patent Literature

PTL 1: Japanese Laid-Open Utility Model Publication No. H2-52325

SUMMARY OF INVENTION

Technical Problem

There are solid electrolytic capacitors of a type in which a plurality of capacitor elements are stacked on top of each other. In such stacked type solid electrolytic capacitors, the quality of connection between the anode leads (or anode portions) of the stacked capacitor elements is important, because if the connection quality is poor, the equivalent series resistance (ESR) of solid electrolytic capacitors will vary. In PTL 1, there is no mention of connection between a plurality of anode leads. Under these circumstances, one of the objects of the present disclosure is to reduce variation in ESR.

Solution to Problem

An aspect of the present disclosure relates to a solid electrolytic capacitor. The solid electrolytic capacitor includes: a plurality of capacitor elements stacked on top of each other, each capacitor element having an anode portion and a cathode portion; an anode lead terminal electrically connected to at least one of the anode portions; and three or more joining portions joining and electrically connecting the stacked anode portions together, wherein the stacked anode portions have a first surface that is located outermost on one side in a stacking direction and a second surface that is located outermost on another side in the stacking direction, and the three or more joining portions include a first joining portion having a first area on the first surface and a second joining portion having a second area smaller than the first area on the first surface.

Another aspect of the present disclosure relates to a method for manufacturing a solid electrolytic capacitor. The manufacturing method is a method for manufacturing a solid electrolytic capacitor including a plurality of capacitor elements stacked on top of each other, each capacitor element having an anode portion and a cathode portion, and an anode lead terminal electrically connected to at least one of the anode portions, the method including: a stacking step of stacking the plurality of capacitor elements on top of each other; a temporary fixing step of temporarily fixing the stacked anode portions having a first surface and a second surface that are located outermost on one side and another side, respectively, in a stacking direction by crimping the stacked anode portions together in the stacking direction with the anode lead terminal; and a joining step of forming three of more joining portions that join and electrically connect the plurality of temporarily fixed anode portions together, wherein the three or more joining portions include a first joining portion having a first area on the first surface and a second joining portion having a second area smaller than the first area on the first surface, and in the joining step, the first joining portion is formed by welding from the first surface, and the second joining portion is formed by welding from the second surface.

Advantageous Effects of Invention

According to the present disclosure, it is possible to reduce variation in ESR.

While novel features of the present invention are set forth particularly in the appended claims, the present invention, both as to organization and content, will be better understood and appreciated, along with other objects and features of the present application, from the following detailed description taken in conjunction with the drawings.

DESCRIPTION OF EMBODIMENTS

Figure 1:
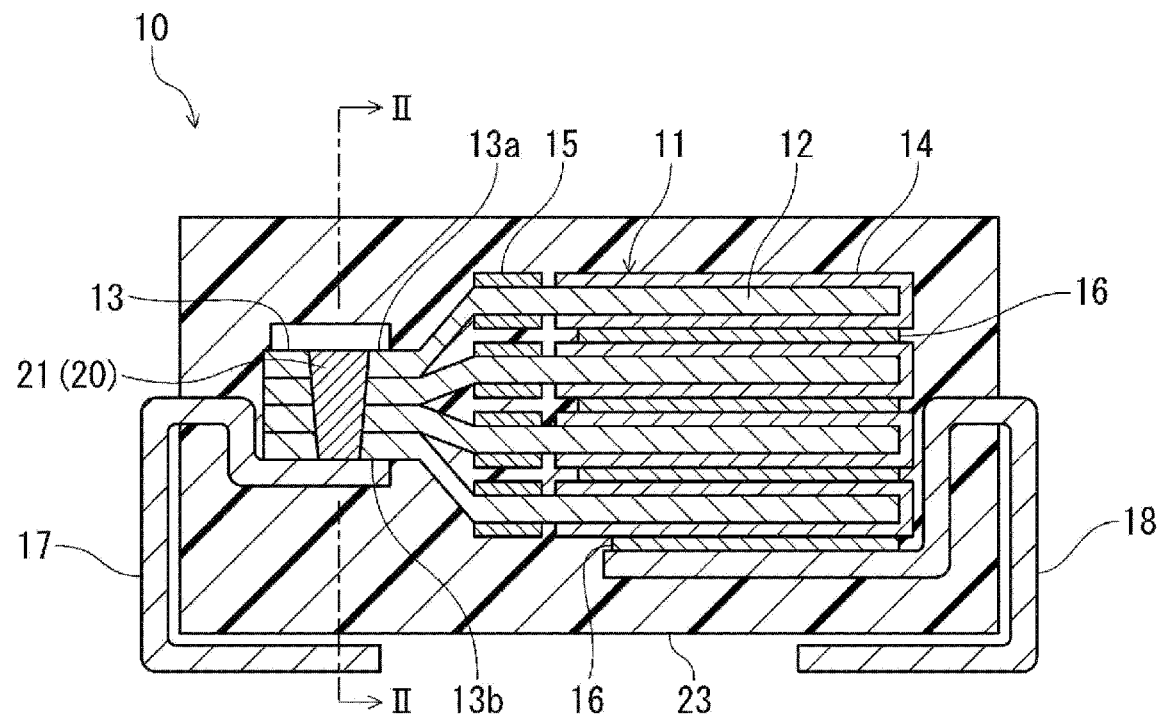
FIG. 1 A cross-sectional view schematically showing the inside of an example of a solid electrolytic capacitor according to the present disclosure.

Hereinafter, embodiments of a solid electrolytic capacitor, and a method for manufacturing a solid electrolytic capacitor, according to the present disclosure will be described using examples. However, the present disclosure is not limited to the examples described below. In the following description, specific numerical values and materials may be given by way of example, but other numerical values and materials may also be employed as long as effects of the present disclosure can be achieved.

(Solid Electrolytic Capacitor)

A solid electrolytic capacitor according to the present disclosure includes a plurality of capacitor elements stacked on top of each other, an anode lead terminal, and three or more joining portions.

Each of the plurality of capacitor elements has an anode portion and a cathode portion. An insulating portion for electrically insulating the anode portion and the cathode portion from each other may be provided between the anode portion and the cathode portion. The insulating portion may be formed of, for example, insulating tape or insulating resin.

The stacked anode portions have a first surface that is located outermost on one side in the stacking direction and a second surface that is located outermost on the other side in the stacking direction. The first surface may be a surface located far from a mount surface of the solid electrolytic capacitor, which is the surface on which exposed portions of lead terminals are located or the surface to be joined to a circuit board or the like. The second surface may be a surface located near the mount surface.

The anode portion may include a portion (a portion located on one side with respect to the insulating portion) of an anode body of the corresponding capacitor element, the anode body being made of a valve metal. The cathode portion may be composed of a solid electrolyte layer and a cathode layer formed sequentially on the surface of a cathode forming portion that is the remaining portion (a portion located on the other side with respect to the insulating portion) of the anode body. A dielectric layer is provided between the anode body and the solid electrolyte layer. Examples of the valve metal constituting the anode body include aluminum, tantalum, niobium, and titanium. The anode body may be a foil of the valve metal or a porous sintered body made of the valve metal.

The dielectric layer is formed at least on the surface of the cathode forming portion, which is the remaining portion of the anode body. The dielectric layer may be made of an oxide (e.g., aluminum oxide) and formed on the surface of the anode body using anodic oxidation, a vapor phase method such as vapor deposition, or the like.

The solid electrolyte layer is formed on the surface of the dielectric layer. The solid electrolyte layer may contain a conductive polymer. The solid electrolyte layer may further contain a dopant as necessary.

Known conductive polymers for use in solid electrolytic capacitors, including, for example, a π-conjugated conductive polymer, can be used as the conductive polymer. Examples of the conductive polymer include polymers having polypyrrole, polythiophene, polyaniline, polyfuran, polyacetylene, polyphenylene, polyphenylene vinylene, polyacene, and polythiophene vinylene as their basic skeletons. Of these polymers, polymers having polypyrrole, polythiophene, or polyaniline as their basic skeletons are preferable. The above-mentioned polymers also include homopolymers, copolymers of two or more monomers, and derivatives thereof (e.g., substitution products having a substituent). For example, polythiophene includes poly (3,4-ethylenedioxythiophene) and the like. As the conductive polymer, one of such conductive polymers may be used alone, or two or more thereof may be used in combination.

As the dopant, for example, at least one selected from the group consisting of low-molecular-weight anions and polyanions may be used. Examples of the anions include, but are not particularly limited to, a sulfate ion, a nitrate ion, a phosphate ion, a borate ion, an organic sulfonate ion, a carboxylate ion, and the like. Examples of a dopant that generates a sulfonate ion include benzenesulfonic acid, p-toluenesulfonic acid, naphthalenesulfonic acid, and the like. Examples of the polyanions include high-molecular-weight type polysulfonic acids, high-molecular-weight type polycarboxylic acids, and the like. Examples of the high-molecular-weight type polysulfonic acids include polyvinylsulfonic acid, polystyrenesulfonic acid, polyallylsulfonic acid, polyacrylsulfonic acid, and polymethacrylsulfonic acid. Examples of the high-molecular-weight type polycarboxylic acids include polyacrylic acid and polymethacrylic acid. The polyanions also include polyestersulfonic acid, phenolsulfonate novolac resin, and the like. However, the polyanions are not limited to theses.

The solid electrolyte layer may further contain a known additive and a known conductive material other than conductive polymers, as necessary. As such a conductive material, for example, at least one selected from the group consisting of conductive inorganic materials, such as manganese dioxide, and TCNQ complex salts may be used.

The cathode layer may be composed of a carbon layer formed on the surface of the solid electrolyte layer and a conductor layer formed on the surface of the carbon layer. The conductor layer may be made of a silver paste. For example, a composition containing silver particles and a resin component (binder resin) may be used as the silver paste. As the resin component, thermosetting resins such as imide resins and epoxy resins are preferably used, although thermoplastic resins can be used.

The anode lead terminal is electrically connected to at least one of the anode portions. The anode lead terminal may be electrically connected to all the anode portions. The anode lead terminal may be made of copper or a copper alloy.

The three or more joining portions join and electrically connect the stacked anode portions together. The three or more joining portions include a first joining portion and a second joining portion. The first joining portion has a first area on the first surface of the stacked anode portions. The second joining portion has a second area on the first surface of the stacked anode portions, the second area being smaller than the first area. In other words, the three or more joining portions include two or more types of joining portions having different areas on the first surface. The three or more joining portions may each extend from the first surface to the second surface. The presence of three or more joining portions such as these improves the joining quality between the stacked anode portions and thus reduces variation in the electrical resistance values between the anode portions. Accordingly, variation in ESR among solid electrolytic capacitors can be reduced.

The three or more joining portions may be arranged linearly or non-linearly. As an example of the former case, it is conceivable to arrange the three or more joining portions linearly along the width direction of the capacitor elements. As an example of the latter case, it is conceivable to arrange some (e.g., two) of the joining portions linearly along the width direction of the capacitor elements and the remainder (e.g., one) of the joining portions spaced apart from the some of the joining portions in the longitudinal direction of the capacitor elements. As another example of the latter case, it is conceivable to arrange all the joining portions spaced apart from each other in the longitudinal direction of the capacitor elements.

Note that, during forming of each of the three or more joining portions, the anode lead terminal may partially melt into the joining portion. In such a case, the "area (first area or second area) of the joining portion" refers to the area of a region that contains not only a portion of the joining portion made of the material of the anode portions but also a portion of the joining portion made of the material of the anode lead terminal that has melted into the joining portion.

The first joining portion may be formed by welding from the first surface. The second joining portion may be formed by welding from the second surface. With this configuration, each joining portion has a larger area on a surface to which the welding heat is applied than on the opposite surface. That is to say, the first joining portion has the first area on the first surface and a third area smaller than the first area on the second surface. The second joining portion has the second area on the first surface and a fourth area larger than the second area on the second surface. The first area and the fourth area may be larger than the second area and the third area.

Both the first joining portion and the second joining portion may be formed by welding from the first surface. Alternatively, both the first joining portion and the second joining portion may be formed by welding from the second surface. With these configurations, the first and second joining portions can be easily formed by welding from one direction. A configuration may also be adopted in which either one of the first joining portion and the second joining portion is formed by welding from either one of the first surface and the second surface, and the other of the first joining portion and the second joining portion is formed by welding from the other of the first surface and the second surface. In this case, it is easy to form the joining portions with a larger overall volume while reducing unevenness of distribution of the joining portions, and thus, the joining quality can be improved even more.

The first area may be larger by a factor of 2 or more than the second area. The first area may be larger by a factor of 2 or more and 8 or less than the second area. In other words, the ratio of the area of a joining portion having the largest area on the first surface to the area of a joining portion having the smallest area on the first surface may be 2 or more and 8 or less, or 4 or more and 8 or less.

The fourth area may be larger by a factor of 2 or more than the third area. The fourth area may be larger by a factor of 2 or more and 8 or less than the third area. In other words, the ratio of the area of a joining portion having the largest area on the second surface to the area of a joining portion having the smallest area on the second surface may be 2 or more and 8 or less, or 4 or more and 8 or less.

The spacing between the three or more joining portions may be 0.2 mm or more and 0.4 mm or less on the first surface or the second surface. With this configuration, the three or more joining portions are densely formed in the anode portions, and the joining quality between the stacked anode portions can therefore be improved even more. Note that the "spacing between the joining portions" means an average value of the distances between the centers (e.g., center points when viewed from the normal direction of the first surface) of the adjacent joining portions.

The anode lead terminal may have a through hole at a position overlapping the second joining portion. With this configuration, the second joining portion can be easily formed by, for example, welding during which heat is applied to the anode portions via the through hole. The through hole may have various shapes, including a circle, an ellipse, a rectangle, a polygon, or the like. The size of the through hole may be larger or smaller than the area (fourth area) of the second joining portion on the second surface. A through hole with a size smaller than the area of the second joining portion on the second surface enables a larger portion of the anode lead terminal to melt into the second joining portion and therefore enhances the effect of reducing ESR.

(Method for Manufacturing Solid Electrolytic Capacitor)

A method for manufacturing a solid electrolytic capacitor according to the present disclosure is a method for manufacturing a solid electrolytic capacitor including a plurality of capacitor elements stacked on top of each other, each capacitor element having an anode portion and a cathode portion, and an anode lead terminal electrically connected to at least one of the anode portions, the method including a stacking step, a temporary fixing step, and a joining step.

In the stacking step, the plurality of capacitor elements are stacked on top of each other.

In the temporary fixing step, the stacked anode portions having a first surface and a second surface that are located outermost on one side and the other side, respectively, in the stacking direction are temporarily fixed by being crimped together in the stacking direction with the anode lead terminal.

In the joining step, three of more joining portions that join and electrically connect the plurality of temporarily fixed anode portions together are formed. The three or more joining portions include a first joining portion having a first area on the first surface and a second joining portion having a second area smaller than the first area on the first surface. In the joining step, the first joining portion is formed by welding from the first surface, and the second joining portion is formed by welding from the second surface.

A solid electrolytic capacitor manufactured using the above-described manufacturing method including the stacking step, the temporary fixing step, and the joining step has improved joining quality between the stacked anode portions and therefore reduced variation in the electrical resistance values between the anode portions, due to the presence of the above-described three or more joining portions. Accordingly, variation in ESR among solid electrolytic capacitors can be reduced.

In the joining step, the three or more joining portions may be formed by laser welding. Note that in the joining step, the three or more joining parts may also be formed using a welding method (e.g., resistance welding) other than laser welding.

The spacing between the three or more joining portions may be 0.2 mm or more and 0.4 mm or less on the first surface or the second surface.

The anode lead terminal may have a through hole. In the joining step, the second joining portion may be formed by welding via the through hole. With this configuration, the second joining portion can be easily formed because the welding heat can be directly applied to the anode portions.

As described above, according to the present disclosure, variation in ESR among solid electrolytic capacitors can be reduced.

Hereinafter, examples of the solid electrolytic capacitor and the method for manufacturing a solid electrolytic capacitor according to the present disclosure will be described in further detail with reference to the drawings. The above-described constituent elements and steps can be applied to constituent elements and steps of the exemplary solid electrolytic capacitor and the exemplary method for manufacturing a solid electrolytic capacitor described below. The constituent elements and steps of the exemplary solid electrolytic capacitor and the exemplary method for manufacturing a solid electrolytic capacitor described below may be changed based on the foregoing description. Conversely, the matters described below may be applied to the above-described embodiments. Of the constituent elements and steps of the exemplary solid electrolytic capacitor and the exemplary method for manufacturing a solid electrolytic capacitor described below, those that are not essential to the solid electrolytic capacitor and the method for manufacturing a solid electrolytic capacitor according to the present disclosure may be omitted. The figures shown below are schematic and do not accurately reflect the shapes and numbers of actual members.

Figure 2:
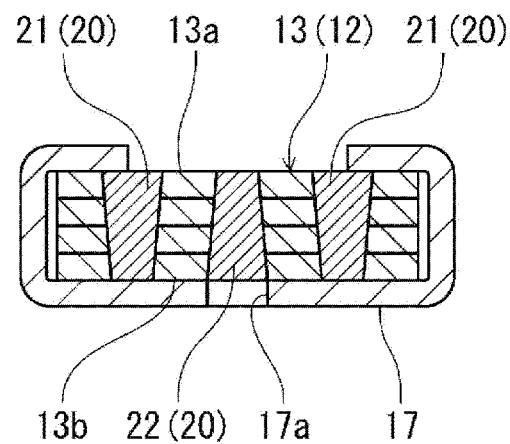
FIG. 2 A side cross-sectional view taken along line II-II in FIG. 1.
Figure 3:
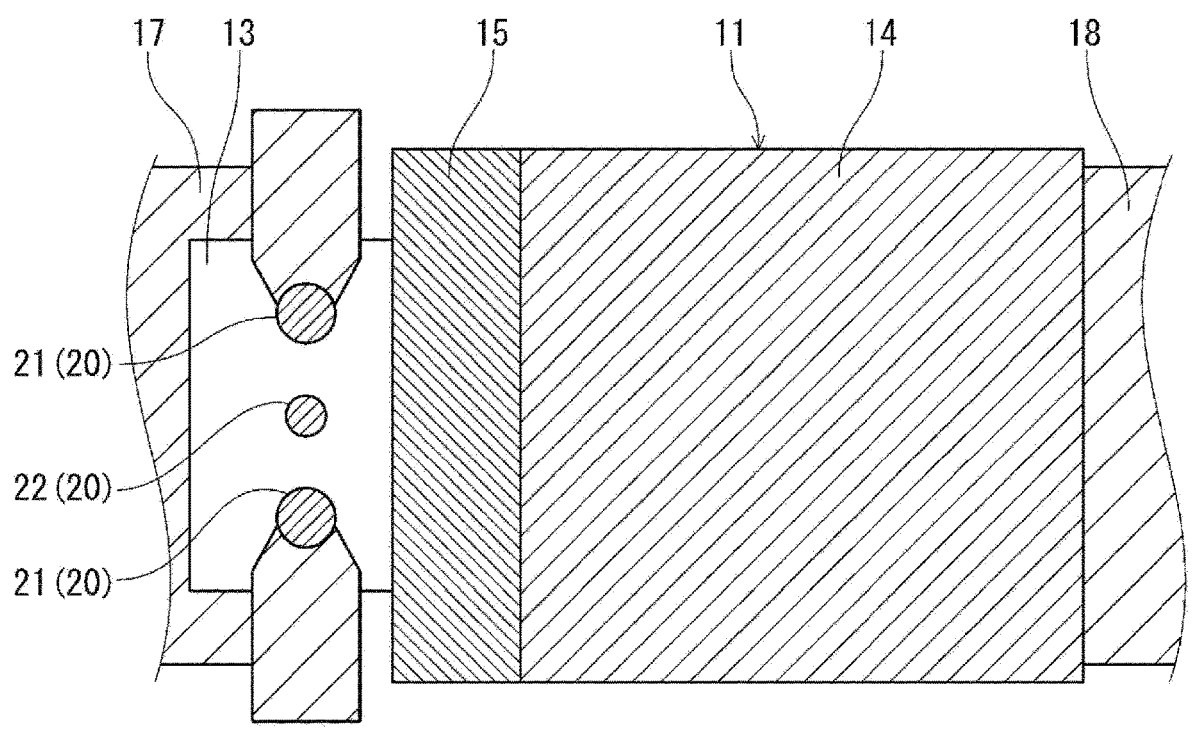
FIG. 3 A plan view of the solid electrolytic capacitor before sealing in a sheathing resin.

As shown in FIGS. 1 to 3, a solid electrolytic capacitor 10 includes a plurality of capacitor elements 11 stacked on top of each other, an anode lead terminal 17, a cathode lead terminal 18, three or more joining portions 20, and a sheathing resin 23.

The plurality of capacitor elements 11 each include an anode portion 13, a cathode portion 14, and an insulating portion 15. The anode portion 13 is composed of a portion of an anode body 12 made of a valve metal (e.g., aluminum). The cathode portion 14 is composed of a solid electrolyte layer and a cathode layer formed sequentially on the surface of a cathode forming portion, which is the remaining portion of the anode body 12. The insulating portion 15 is formed of insulation tape and electrically insulates the anode portion 13 and the cathode portion 14 from each other. A dielectric layer is provided between the anode body 12 and the solid electrolyte layer.

The stacked anode portions 13 have a first surface 13a that is located outermost on one side (upper side in FIG. 1) in the stacking direction (vertical direction in FIG. 1) and a second surface 13b that is located outermost on the other side (lower side in FIG. 1) in the stacking direction.

The anode lead terminal 17 is electrically connected to the anode portions 13 of the capacitor elements 11. The anode lead terminal 17 is made of a copper alloy, for example.

The anode lead terminal 17 has a through hole 17a on a placement surface (surface facing the second surface 13b) thereof on which the anode portions 13 of the capacitor elements 11 are placed (see FIG. 2). The through hole 17a is a circular hole penetrating the anode lead terminal 17 in the thickness direction. The through hole 17a is formed at a position overlapping a second joining portion 22, which will be described later. The shape of the through hole 17 a is not limited to a circle, and may be any other shape.

The cathode lead terminal 18 is electrically connected to the cathode portions 14 of the capacitor elements 11. The cathode lead terminal 18 is made of a copper alloy, for example. The cathode lead terminal 18 is joined to the cathode portions 14 of the capacitor elements 11 using a conductive adhesive 16. The cathode portions 14 located adjacent to each other are also joined to each other using the conductive adhesive 16.

The three or more joining portions 20 join and electrically connect the stacked anode portions 13 together. The three or more joining portions 20 include two first joining portions 21 and one second joining portion 22. The second joining portion 22 is disposed between the two first joining portions 21. The first joining portions 21 each have a first area on the first surface 13a of the stacked anode portions 13. The second joining portion 22 has a second area on the first surface 13a of the stacked anode portions 13, the second area being smaller than the first area (see FIG. 3). In the present embodiment, the first area is larger by a factor of approximately 3 than the second area.

The three or more joining portions 20 each extend from the first surface 13a to the second surface 13b. The first joining portions 21 are slightly tapered from the first surface 13a toward the second surface 13b. The second joining portion 22 is slightly tapered from the second surface 13b toward the first surface 13a. However, the first joining portions 21 and the second joining portion 22 do not need to be tapered as described above.

In the present embodiment, the three joining portions 20 include two first joining portions 21 and one second joining portion 22, but the three joining portions 20 may include one first joining portion 21 and two second joining portions 22. In the latter case, the first joining portion 21 may be disposed between the two second joining portions 22. In addition, in the latter case, the anode lead terminal 17 may have two through holes 17a at positions overlapping the respective first joining portions 21. A configuration may also be adopted in which four or more joining portions 20 are provided.

The first joining portions 21 are formed by welding (e.g., laser welding) from the first surface 13a. The second joining portion 22 is formed by welding (e.g., laser welding) from the second surface 13b via the through hole 17a.

The spacing (spacing in the left-right direction in FIG. 2) between the three joining portions 20 is 0.2 mm or more and 0.4 mm or less on the first surface 13a or the second surface 13b. In this embodiment, this spacing is about 0.3 mm.

The sheathing resin 23 coats the plurality of capacitor elements 11, with a portion of the anode lead terminal 17 and a portion of the cathode lead terminal 18 exposed to the outside. The sheathing resin 23 is made of an insulating resin material. The exposed portions of the anode lead terminal 17 and the cathode lead terminal 18 constitute respective external terminals of the solid electrolytic capacitor 10.

—Method for Manufacturing Solid Electrolytic Capacitor—

A method for manufacturing the above-described solid electrolytic capacitor 10 will be described. The solid electrolytic capacitor manufacturing method includes a preparing step, a stacking step, a curing step, a temporary fixing step, a joining step, and a sealing step.

In the preparing step, the plurality of capacitor elements 11 each having the anode portion 13 and the cathode portion 14 are prepared.

In the stacking step, the plurality of capacitor elements 11 are stacked on top of each other. In the stacking step, the plurality of capacitor elements 11 may be stacked on the anode lead terminal 17 and the cathode lead terminal 18. In the stacking step, the plurality of capacitor elements 11 may be stacked with the conductive adhesive 16 provided between the cathode portions 14.

In the curing step, the conductive adhesive 16 is cured. Curing of the conductive adhesive 16 may be performed by, for example, pressing an iron (not shown) as a heat source from above the plurality of stacked capacitor elements 11.

In the temporary fixing step, the stacked anode portions 13 having the first surface 13a and the second surface 13b are temporarily fixed by being crimped together in the stacking direction with the anode lead terminal 17.

In the joining step, the two first joining portions 21 and the one second joining portion 22 that join and electrically connect the plurality of temporarily fixed anode portions 13 together are formed. In the joining step, the first joining portions 21 are formed by laser welding from the first surface 13a, and the second joining portion 22 is formed by laser welding from the second surface 13b. In the joining step, the second joining portion 22 is formed by performing laser welding via the through hole 17a of the anode lead terminal 17.

In the sealing step, the entire stack is sealed in the sheathing resin 23 such that a portion of the anode lead terminal 17 and a portion of the cathode lead terminal 18 are exposed to the outside. The exposed portions of the anode lead terminal 17 and the cathode lead terminal 18 are bent along the outer surface of the sheathing resin 23 and constitute respective external terminals of the solid electrolytic capacitor 10. Thus, the solid electrolytic capacitor 10 of the present embodiment is obtained.

EXAMPLES

Solid electrolytic capacitors 10 of Examples 1 and 2 and Comparative Examples 1 and 2 described below were tested for variation in ESR. Here, the term "variation in ESR" refers to the standard deviation of ESR values of ten solid electrolytic capacitors 10. The ESR of the solid electrolytic capacitors 10 was measured as a resistance value at 100 kHz using an LCR meter.

The term "volume ratio of joining portions" as used in the following description of Examples and Comparative Examples refers to the ratio of the total volume of all the joining portions 20 to the total volume of the stacked anode portions 13. For example, when the total volume of the stacked anode portions 13 is 100 and there are two joining portions each having a volume of 10, the volume ratio of the joining portions is 20%. The volume ratio of the joining portions was obtained by analyzing the joining portions 20 by X-ray CT. Specifically, an image is captured in which the cross-sectional area of all joining portions (here, the sum of the cross-sectional areas of the three joining portions) in a side cross-sectional view such as that shown in FIG. 2 is the largest. Then, the ratio of the cross-sectional area of all the joining portions to the sum of the cross-sectional area of all the joining portions and the cross-sectional areas of the anode portions is calculated as the "volume ratio of the joining portions". The greater the volume ratio of the joining portions, the more desirable it is. The volume ratio of the joining portions may be 50% or more, or 60% or more.

The term "area ratio of joining portions" as used in the following description of Examples and Comparative Examples refers to the ratio of the area of a joining portion 20 having the largest area on the first surface 13a to the area of a joining portion 20 having the smallest area on the first surface 13a. For example, when the area of the former joining portion is 100 and the area of the latter joining portion is 50, the area ratio of the joining portions is 2. The area ratio of the joining portions was obtained by observing the joining portions 20 under an optical microscope. The term "spacing between joining portions" as used in the following description of Examples and Comparative Examples refers to the spacing between the joining portions 20 on the first surface 13a. The spacing between the joining portions was obtained by observing the joining portions 20 under an optical microscope.

Example 1

In Example 1, solid electrolytic capacitors 10 having the structure of the above embodiment were produced. A specific production method will be described below.
—Production of Capacitor Elements—
An aluminum foil with a thickness of 100 μm was prepared, and the surface of the aluminum foil was etched to obtain an anode body 12. A dielectric layer containing aluminum oxide was formed on the surface of the anode body 12 by immersing the anode body 12 in a conversion solution and applying a DC voltage thereto. Next, a solid electrolyte layer was formed on the surface of the dielectric layer by immersing the anode body 12 with the dielectric layer formed thereon and a counter electrode in a polymerization solution containing polypyrrole as a conductive polymer and performing electrolytic polymerization at a polymerization solution temperature of 25° C. and a polymerization voltage of 3 V. A dispersion (carbon paste) in which flake graphite was dispersed in water was applied to the solid electrolyte layer, which was then heated at 200° C. In this manner, a first layer including the solid electrolyte layer and the carbon layer was formed. A metal paste containing silver particles, a binder resin, and a solvent was applied to the surface of the carbon layer on the two main surfaces of the anode body 12. Subsequently, heating was performed at 210° C. for 10 minutes to thereby form a second layer. Thus, a capacitor element 11 was obtained.
—Temporary Fixing of Stack—
Capacitor elements 11 obtained as described above were stacked on top of each other on an anode lead terminal 17 and a cathode lead terminal 18, and a metal paste containing silver particles, a binder resin, and a solvent was applied to the cathode portions 14. Subsequently, heating was performed at 210° C. for 5 minutes to temporarily fix the cathode portions 14. Furthermore, the anode portions 13 were temporarily fixed by crimping a portion of the anode lead terminal 17 onto the anode portions 13, and thus, the stack of the capacitor elements 11 was fixed.
—Welding of Stack—
Two locations on the anode portions 13 of the temporarily fixed stack were irradiated with a laser beam from the first surface 13a side, followed by irradiation of one location with a laser beam from the second surface 13b side via the through hole 17a. Consequently, two first joining portions 21 and one second joining portion 22 located therebetween were formed, and thus, a stack that was laser-welded at a total of three locations was obtained.
—Sealing in Sheathing Resin—
The welded stack was sealed in a sheathing resin 23 such that a portion of the anode lead terminal 17 and a portion of the cathode lead terminal 18 were exposed to the outside. Thus, a solid electrolytic capacitor 10 was obtained.

In the solid electrolytic capacitor 10 of Example 1, the volume ratio of the joining portions was 54%, the area ratio of the joining portions was 6.5, and the spacing between the joining portions was 0.35 mm. The ESR of the solid electrolytic capacitor 10 of Example 1 was 75.2 with the ESR of a solid electrolytic capacitor 10 of Comparative Example 2 being set to 100. The variation in ESR (standard deviation) among solid electrolytic capacitors 10 of Example 1 was 15.2 with the variation in ESR among solid electrolytic capacitors 10 of Comparative Example 2 being set to 100.

Example 2

In Example 2, three locations on the anode portions 13 of the temporarily fixed stack were irradiated with a laser beam from the first surface 13a side. Consequently, three first joining portions 21 were formed, and thus, a stack that was laser-welded at a total of three locations was obtained. A solid electrolytic capacitor 10 was produced using a method similar to that of Example 1 above except for this difference.

In the solid electrolytic capacitor 10 of Example 2, the volume ratio of the joining portions was 54%, the area ratio of the joining portions was 1.5, and the spacing between the joining portions was 0.35 mm. The ESR of the solid electrolytic capacitor 10 of Example 2 was 75.2 with the ESR of the solid electrolytic capacitor 10 of Comparative Example 2 being set to 100. The variation in ESR (standard deviation) among solid electrolytic capacitors 10 of Example 2 was 37.5 with the variation in ESR among the solid electrolytic capacitors 10 of Comparative Example 2 being set to 100.

Comparative Example 1

In Comparative Example 1, two locations on the temporarily fixed stack of anode portions 13 were irradiated with a laser beam from the first surface 13*a* side. Consequently, two first joining portions 21 were formed, and thus, a stack that was laser-welded at a total of two locations was obtained. A solid electrolytic capacitor 10 was produced using a method similar to that of Example 1 above except for this difference.

In the solid electrolytic capacitor 10 of Comparative Example 1, the volume ratio of the joining portions was 37%, the area ratio of the joining portions was 1.0, and the spacing between the joining portions was 0.7 mm. The ESR of the solid electrolytic capacitor 10 of Comparative Example 1 was 75.2 with the ESR of the solid electrolytic capacitor 10 of Comparative Example 2 being set to 100. The variation in ESR (standard deviation) among solid electrolytic capacitors 10 of Comparative Example 1 was 43.6 with the variation in ESR among the solid electrolytic capacitors 10 of Comparative Example 2 being set to 100.

Comparative Example 2

In Comparative Example 2, one location on the anode portions 13 of the temporarily fixed stack was irradiated with a laser beam from the first surface 13*a* side. Consequently, one first joining portion 21 was formed, and thus, a stack that was laser-welded at one location was obtained. A solid electrolytic capacitor 10 was produced using a method similar to that of Example 1 above except for this difference.

In the solid electrolytic capacitor 10 of Comparative Example 2, the volume ratio of the joining portion was 18%. The ESR of the solid electrolytic capacitor 10 of Comparative Example 2 was set to 100 as a reference value. The variation in ESR (standard deviation) among solid electrolytic capacitors 10 of Comparative Example 2 was set to 100 as a reference value.

As described above, the variation in ESR was smaller in Examples 1 and 2 than in Comparative Examples 1 and 2. In particular, this trend was prominent in Example 1. Therefore, it can be said that the superiority of Examples 1 and 2 was demonstrated.

Although the present invention has been described in terms of the presently preferred embodiments, such disclosure should not be construed as limiting. Various modifications and alterations will no doubt become apparent to those skilled in the art to which the present invention pertains, after having read the above disclosure. Accordingly, it is intended that the appended claims be interpreted as covering all modifications and alterations that can be implemented without departing from the true spirit and scope of the invention.

INDUSTRIAL APPLICABILITY

The present disclosure is applicable to a solid electrolytic capacitor and a method for manufacturing a solid electrolytic capacitor.

REFERENCE SIGNS LIST

10: solid electrolytic capacitor
11: capacitor element
12: anode body
13: anode portion
  13*a*: first surface
  13*b*: second surface
14: cathode portion
15: insulating portion
16: conductive adhesive
17: anode lead terminal
  17*a*: through hole
18: cathode lead terminal
20: joining portion
  21: first joining portion
  22: second joining portion
23: sheathing resin

The invention claimed is:

1. A solid electrolytic capacitor comprising:
  a plurality of capacitor elements stacked on top of each other, each capacitor element having an anode portion and a cathode portion;
  an anode lead terminal electrically connected to at least one of the anode portions; and
  three or more joining portions joining and electrically connecting the stacked anode portions together,
  wherein the stacked anode portions have a first surface that is located outermost on one side in a stacking direction and a second surface that is located outermost on another side in the stacking direction, and
  the three or more joining portions include a first joining portion having a first area on the first surface and a second joining portion having a second area smaller than the first area on the first surface.

2. The solid electrolytic capacitor according to claim 1, wherein the first joining portion is formed by welding from the first surface, and
  the second joining portion is formed by welding from the second surface.

3. The solid electrolytic capacitor element according to claim 1, wherein the first area is larger by a factor of 2 or more than the second area.

4. The solid electrolytic capacitor element according to claim 1, wherein spacing between the three or more joining portions is from 0.2 mm to 0.4 mm on the first surface or the second surface.

5. The solid electrolytic capacitor element according to claim 1, wherein the anode lead terminal has a through hole at a position overlapping the second joining portion.

6. A method for manufacturing a solid electrolytic capacitor including:
  a plurality of capacitor elements stacked on top of each other, each capacitor element having an anode portion and a cathode portion; and
  an anode lead terminal electrically connected to at least one of the anode portions, the method comprising:
  a stacking step of stacking the plurality of capacitor elements on top of each other;
  a temporary fixing step of temporarily fixing the stacked anode portions having a first surface and a second surface that are located outermost on one side and another side, respectively, in a stacking direction by crimping the stacked anode portions together in the stacking direction with the anode lead terminal; and
  a joining step of forming three of more joining portions that join and electrically connect the plurality of temporarily fixed anode portions together,
  wherein the three or more joining portions include a first joining portion having a first area on the first surface and a second joining portion having a second area smaller than the first area on the first surface, and
  in the joining step, the first joining portion is formed by welding from the first surface, and the second joining portion is formed by welding from the second surface.

7. The method for manufacturing a solid electrolytic capacitor according to claim 6, wherein, in the joining step, the three or more joining portions are formed by laser welding.

8. The method for manufacturing a solid electrolytic capacitor according to claim 6, wherein spacing between the three or more joining portions is from 0.2 mm to 0.4 mm on the first surface or the second surface.

9. The method for manufacturing a solid electrolytic capacitor according to claim 6,
- wherein the anode lead terminal has a through hole, and
- in the joining step, the second joining portion is formed by welding via the through hole.

* * * * *